(12) United States Patent
Marsh et al.

(10) Patent No.: US 8,035,270 B2
(45) Date of Patent: Oct. 11, 2011

(54) WHEEL MOTOR

(75) Inventors: Gregory A. Marsh, Ferndale, MI (US);
Herbert L. Adams, Waterford, MI (US);
Charles D. Syverson, North Mankato, MN (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 12/825,405

(22) Filed: Jun. 29, 2010

(65) Prior Publication Data

US 2010/0327674 A1    Dec. 30, 2010

Related U.S. Application Data

(60) Provisional application No. 61/221,768, filed on Jun. 30, 2009.

(51) Int. Cl.
*H02K 1/06* (2006.01)
(52) U.S. Cl. .............. 310/216.023; 310/44; 310/179; 310/180
(58) Field of Classification Search ........... 310/216.023, 310/179, 180, 44, 68
See application file for complete search history.

(56) References Cited

U.S. PATENT DOCUMENTS

| | | | |
|---|---|---|---|
| 3,317,874 A * | 5/1967 | Honsinger | 336/120 |
| 3,423,615 A | 1/1969 | Patton | |
| 3,502,914 A * | 3/1970 | Cox | 310/216.017 |
| 3,680,671 A * | 8/1972 | Hendershot et al. | 192/21.5 |
| 4,021,691 A | 5/1977 | Dukshtau et al. | |
| 4,313,068 A | 1/1982 | Avrukh et al. | |
| 4,322,649 A | 3/1982 | Troeder et al. | |
| 4,563,606 A | 1/1986 | Fukasawa et al. | |
| 4,786,834 A | 11/1988 | Grant et al. | |
| 5,196,749 A | 3/1993 | Palma et al. | |
| 5,508,571 A | 4/1996 | Shafer, Jr. | |
| 5,753,991 A | 5/1998 | Couture et al. | |

(Continued)

FOREIGN PATENT DOCUMENTS

CN    1617422    11/2004

(Continued)

OTHER PUBLICATIONS

International Search Report and Written Opinion for International Application No. PCT/US2010/040556, dated Feb. 23, 2011.

*Primary Examiner* — Quyen Leung
*Assistant Examiner* — Alex W Mok
(74) *Attorney, Agent, or Firm* — Harness, Dickey & Pierce, P.L.C.

(57) ABSTRACT

A wheel motor can include a stator adapted to be coupled to a vehicle. The stator can include a body portion and a core extending radially outward from the body portion. A rotor can be disposed about the stator and can have a portion positioned radially outboard of and around the stator core. The rotor can include a plurality of magnets aligned with the stator core, and can be adapted to be coupled to a rotatable vehicle component. At least one winding element can be disposed circumferentially around the stator core, and a controller can be positioned in a pocket integrally formed in the stator body portion. The controller can be coupled to the at least one winding element and can be arranged to selectively provide a current supply to the at least one winding element to generate a magnetic flux to rotate the rotor relative to the stator.

19 Claims, 7 Drawing Sheets

U.S. PATENT DOCUMENTS

| | | | |
|---|---|---|---|
| 5,798,594 A * | 8/1998 | Radovsky | 310/180 |
| 5,806,643 A | 9/1998 | Fitz | |
| 5,962,938 A * | 10/1999 | Bobay et al. | 310/67 R |
| 6,059,088 A | 5/2000 | Sekine et al. | |
| 6,373,157 B1 | 4/2002 | Sekine | |
| 6,512,314 B1 | 1/2003 | Nakanishi | |
| 6,577,033 B1 | 6/2003 | Sekine | |
| 6,651,309 B2 | 11/2003 | Gay et al. | |
| 6,710,502 B2 | 3/2004 | Maslov et al. | |
| 6,750,581 B2 | 6/2004 | Neet | |
| 6,759,779 B2 | 7/2004 | Neet | |
| 6,787,961 B2 | 9/2004 | Neet et al. | |
| 6,826,823 B2 | 12/2004 | Neet | |
| 6,831,385 B2 | 12/2004 | Hasegawa et al. | |
| 6,841,908 B2 | 1/2005 | Hasegawa et al. | |
| 6,862,797 B2 | 3/2005 | Neet | |
| 6,896,111 B2 | 5/2005 | Fitz et al. | |
| 6,979,926 B2 | 12/2005 | Ogawa et al. | |
| 7,049,725 B2 | 5/2006 | Blouin et al. | |
| 7,213,694 B2 | 5/2007 | Fitz et al. | |
| 7,242,124 B2 | 7/2007 | Ogawa et al. | |
| 7,262,536 B2 | 8/2007 | Rahman et al. | |
| 7,332,837 B2 | 2/2008 | Ward et al. | |
| 7,445,067 B2 | 11/2008 | Marsh et al. | |
| 2004/0119359 A1 | 6/2004 | Neet | |
| 2004/0207281 A1 * | 10/2004 | Detela | 310/162 |
| 2004/0212259 A1 | 10/2004 | Gould | |
| 2005/0035678 A1 | 2/2005 | Ward et al. | |
| 2006/0202582 A1 | 9/2006 | Umesaki et al. | |
| 2007/0228859 A1 | 10/2007 | Rao | |
| 2007/0228860 A1 | 10/2007 | Rao | |
| 2007/0262659 A1 | 11/2007 | Inayama | |
| 2008/0016970 A1 | 1/2008 | Klein | |
| 2008/0022512 A1 | 1/2008 | Takizawa et al. | |
| 2008/0030155 A1 | 2/2008 | Patel et al. | |
| 2008/0053726 A1 | 3/2008 | Marsh et al. | |
| 2008/0054737 A1 | 3/2008 | Inayama et al. | |
| 2008/0054750 A1 | 3/2008 | Koike | |
| 2008/0067886 A1 | 3/2008 | Rau et al. | |
| 2008/0169140 A1 | 7/2008 | Perry | |
| 2008/0197740 A1 | 8/2008 | Hughes | |

FOREIGN PATENT DOCUMENTS

| | | |
|---|---|---|
| DE | 3534883 | 9/1985 |
| EP | 0085018 | 1/1983 |
| EP | 0600190 | 10/1993 |
| EP | 1273813 | 4/2002 |
| JP | 57-026419 | 2/1982 |
| JP | 62-053160 | 3/1987 |
| JP | 2000-0179643 | 6/2000 |
| JP | 2001-349410 | 6/2000 |
| JP | 2000-329164 | 11/2000 |
| JP | 2002-174237 | 6/2002 |
| JP | 2002281722 A | 9/2002 |
| JP | 2003-274594 | 9/2003 |
| JP | 2007253687 A | 10/2007 |
| KR | 100640319 B1 | 10/2006 |
| KR | 100657129 B1 | 12/2006 |
| WO | WO 97/08805 | 3/1997 |

* cited by examiner

WHEEL MOTOR

CROSS REFERENCE TO RELATED APPLICATIONS

This application claims the benefit of U.S. Provisional Application No. 61/221,768, filed on Jun. 30, 2009, the disclosure of which is hereby incorporated herein by reference.

FIELD

The present disclosure relates generally to a wheel motor and, more particularly, to an electric wheel motor for use in a vehicle.

BACKGROUND

Vehicle manufacturers are actively working to develop alternative powertrain systems that reduce dependency on gasoline as well as reduce the level of pollutants exhausted into the air by vehicles equipped with conventional internal combustion engines. To that end, vehicle manufactures have been developing powertrain systems that employ electric wheel motors to generate motive power. These electric wheel motors can reduce or eliminate the need for a gasoline powered engine thereby improving fuel economy and reducing emissions. However, drawbacks have been noted with such electric wheel motors, including packaging constraints due to a large size of the wheel motor and durability issues associated with control devices and the like being disposed external to the wheel motor assembly.

Accordingly, there remains a need in the art for an improved wheel motor assembly that overcomes the aforementioned and other disadvantages.

SUMMARY

This section provides a general summary of some aspects of the present disclosure, and is not a comprehensive listing or detailing of either the full scope of the disclosure or all of the features described therein.

In one aspect, a wheel motor according to the principles of the present disclosure is provided. The wheel motor can include a stator adapted to be coupled to a vehicle structure. The stator can include a body portion and a core extending radially outward from the body portion. A rotor can be disposed about the stator and can have a portion positioned radially outboard of and around the stator core. The rotor can further include a plurality of magnets aligned with the stator core, and can be adapted to be coupled to a rotatable vehicle component so as to be rotatable relative to the stator. At least one winding element can be disposed circumferentially around the stator core, and a controller can be positioned in a pocket integrally formed in the body portion of the stator. The controller can be coupled to the at least one winding element and can be arranged to selectively provide a supply of current to the at least one winding element to generate a magnetic flux to rotate the rotor relative to the stator.

In another aspect, a wheel motor according to the principles of the present disclosure is provided. The wheel motor can include a stator adapted to be fixed to a wheel hub assembly. The stator can include a body portion and a core formed from insulated powdered metal. The body portion can have a mounting region adapted to engage the wheel hub assembly, and the core can have a U-shape and can be positioned radially outboard of the body portion. The U-shape can include axially inboard and outboard radial surfaces that are spaced apart from each other and connected by a radially outermost axial surface, where the radially outermost axial surface can include a plurality of radial slots spaced apart from each other around a circumference of the stator core. A rotor can be disposed about the stator and can have a U-shaped portion positioned radially outboard of and around the U-shaped stator core. The rotor can include a plurality of magnets positioned in a U-shaped configuration on a radially inner surface of the rotor U-shaped portion, where the rotor can be adapted to be coupled to a rotatable portion of the wheel hub assembly so as to be rotatable relative to the stator. A plurality of laminations can be positioned in the plurality of radial slots and arranged to extend radially outboard from the stator core outermost axial surface so as to form a plurality of lamination slots. At least one winding element can be disposed circumferentially about the stator core so as to be positioned in each lamination slot, where the at least one winding element can substantially conform to the U-shape of the stator core. A controller can be positioned in a pocket integrally formed in the stator body portion. The pocket can be positioned radially inboard of the stator core and radially outboard of the mounting area, and the controller can be coupled to the at least one winding element. The rotor U-shaped portion can be disposed about the stator core U-shaped portion such that the respective axially inboard and outboard surfaces and the radially outboard surfaces of the rotor and stator are opposed from each other and there is an air gap between the plurality of U-shaped rotor magnets and the at least one winding element. The controller can be arranged to selectively provide a supply of current to the at least one winding element to generate a three dimensional magnetic flux to rotate the rotor relative to the stator.

In yet another aspect, a wheel motor according to the principles of the present disclosure is provided and can include a stator, a rotor, a winding element and a controller. The stator can be adapted to be coupled to a vehicle structure and can include a body portion and a core extending radially outboard from the body portion. The rotor can be disposed about the stator. A controller can be positioned in a pocket integrally formed in the body portion of the stator core and can be coupled to the winding element.

According to another aspect, a wheel motor according to the principles of the present disclosure is provided and can include a stator, a rotor positioned about the stator, and three sets of winding elements. The stator can include a body portion and a core extending from the body portion. Each set of winding elements can be positioned circumferentially about the stator core in a double layer configuration such that a repeating pattern of the three sets of windings can be established about the stator core.

In accordance with another aspect, a wheel motor according to the principles of the present disclosure is provided and can include a stator adapted to be coupled to the vehicle, a rotor positioned about the stator, three sets of winding elements positioned circumferentially about the stator, and three controllers positioned within respective pockets formed in the stator. Each controller of the three controllers can be coupled to a respective set of winding elements.

In still another aspect, a wheel motor according to the principles of the present disclosure is provided and can include a stator adapted to be coupled to a vehicle structure, a rotor positioned about the stator and adapted to be coupled to a rotatable vehicle component so as to be rotatable relative to the stator, and an air circulating arrangement positioned in an axially outboard portion of the rotor. The air circulating arrangement can include an inwardly angled annular recess having a plurality of apertures formed therein, where each of the plurality of apertures can be separated by a radial fin.

In accordance with still another aspect, a wheel motor according to the principles of the present disclosure is provided and can include a stator, a rotor positioned about the stator, and a sealing element. The sealing element can include a body portion positioned on the stator and a sealing portion extending from the body portion. The sealing portion can be arranged to sealingly engage the rotor so as to maintain a sealed connection between the rotor and the stator.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
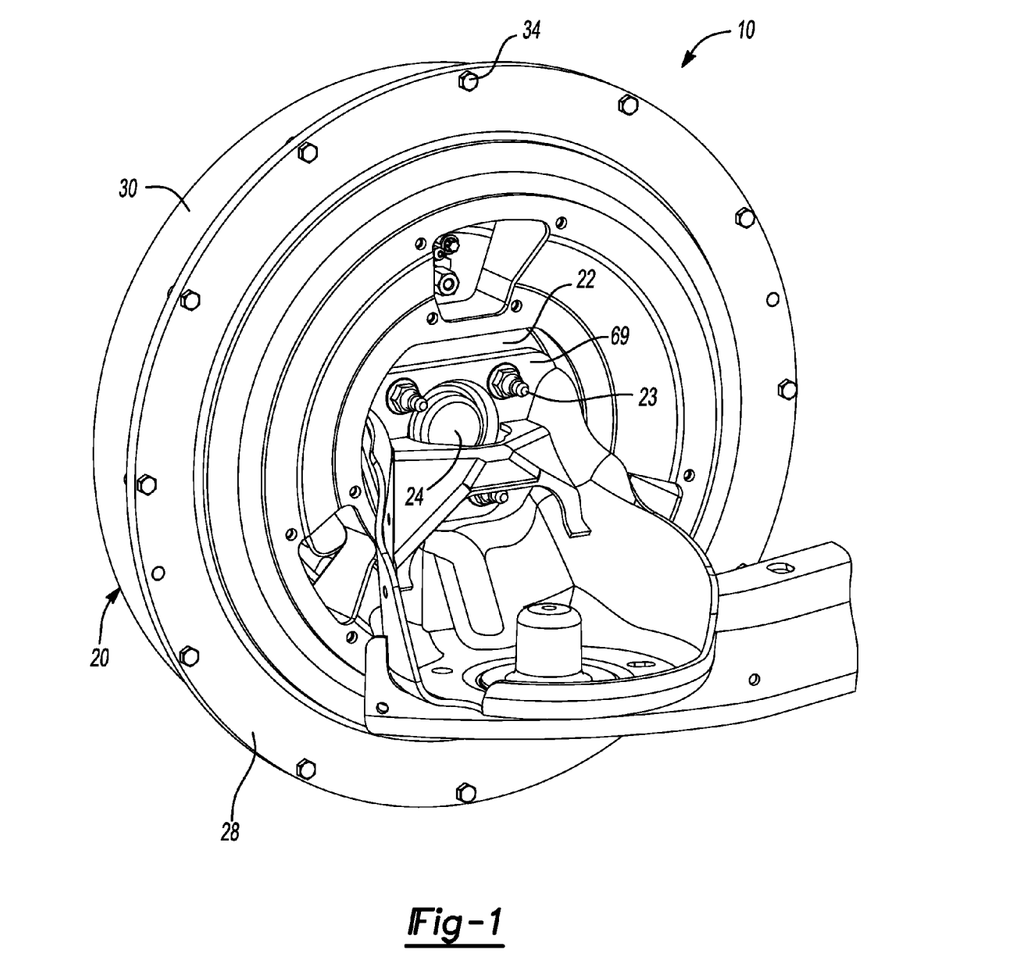
FIG. 1 is a perspective view of an inboard side of a wheel motor assembly according to the principles of the present disclosure.
Figure 2:
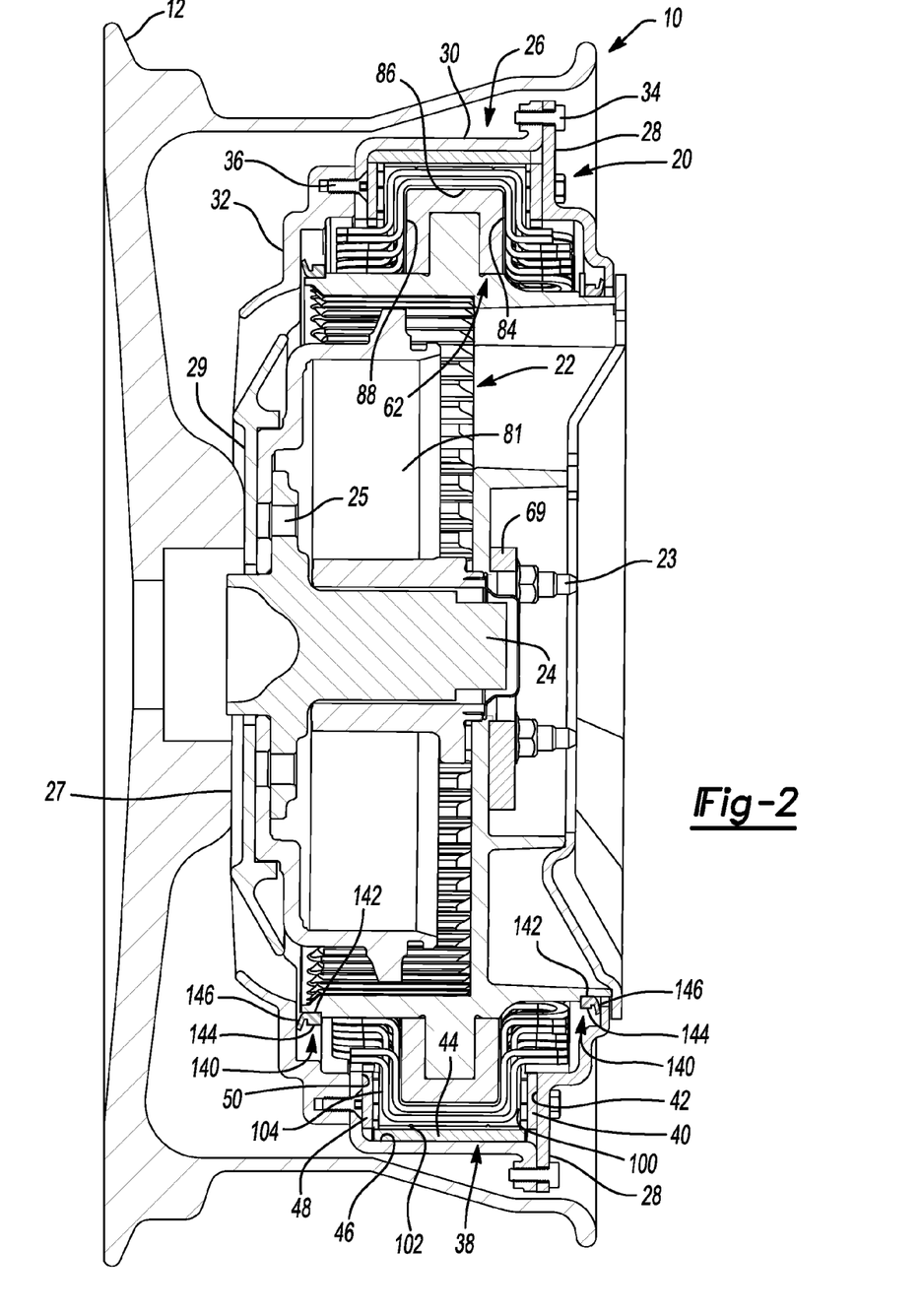
FIG. 2 is a sectional view of the wheel motor assembly according to the principles of the present disclosure.

With reference to FIGS. 1-7 of the drawings, a wheel motor assembly 10 is provided in accordance with the principles of the present disclosure. Wheel motor assembly 10 can include a rotor 20 and a stator 22 arranged to be attached in a non-rotatable manner to a wheel hub assembly 24 with fasteners 23, as generally shown in FIGS. 1 and 2. Wheel motor assembly 10 can be dimensioned so as to be packaged within or substantially within a rim 12 as shown in FIG. 2. Rotor 20 can include a three-piece structural housing 26 that can be in the form of a first portion 28, a second portion 30, and a third portion 32. The first portion 28 can be positioned on an axially inboard side of the wheel motor assembly 10 and can be attached to the second portion 30 with fasteners 34. The third portion 32 can be generally positioned on an axially outboard side of the wheel motor assembly 10 and can be attached to second portion 30 with fasteners 36 as shown in FIG. 2. It should be appreciated that while rotor 20 has been discussed as having a three-piece construction assembled with fasteners, rotor 20 can include other configurations as may be required, such as a one or two piece construction, and can be assembled with any appropriate means if configured in other than a one-piece construction.

Figure 3:
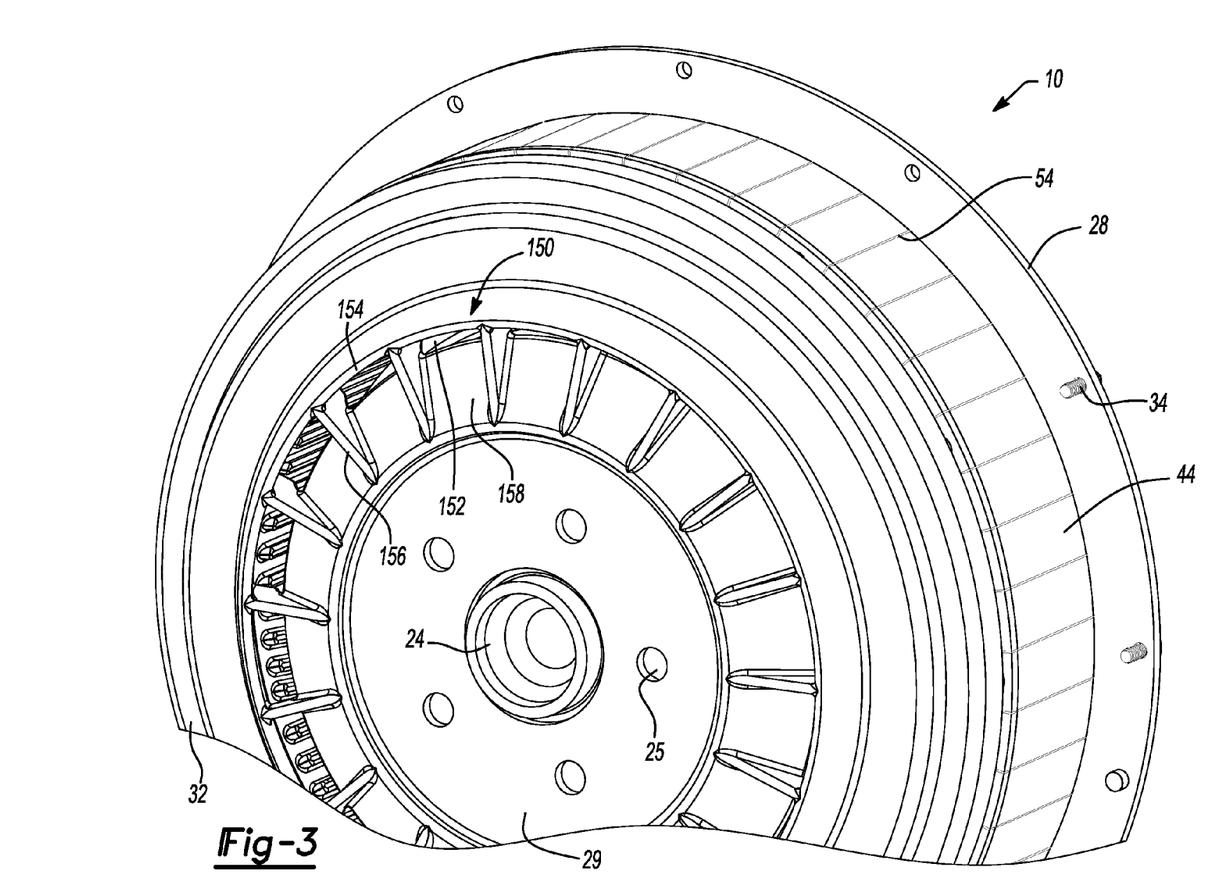
FIG. 3 is a partial perspective view of the wheel motor assembly with a portion of a rotor removed according to the principles of the present disclosure.

Rotor 20 can be coupled to wheel hub assembly 24 via apertures 25 in third portion 32 so as to rotate with wheel hub 24 and relative to fixed stator 22, as generally shown in FIGS. 1-3. Rim 12 can likewise be mounted to wheel hub assembly 24 using apertures that align with apertures 25 of rotor third portion 32. Rim 12 can also be mounted on wheel hub assembly 24 such that a radial wall 27 of rim 12 abuts a corresponding radial wall 29 of rotor third portion 32.

Figure 7:
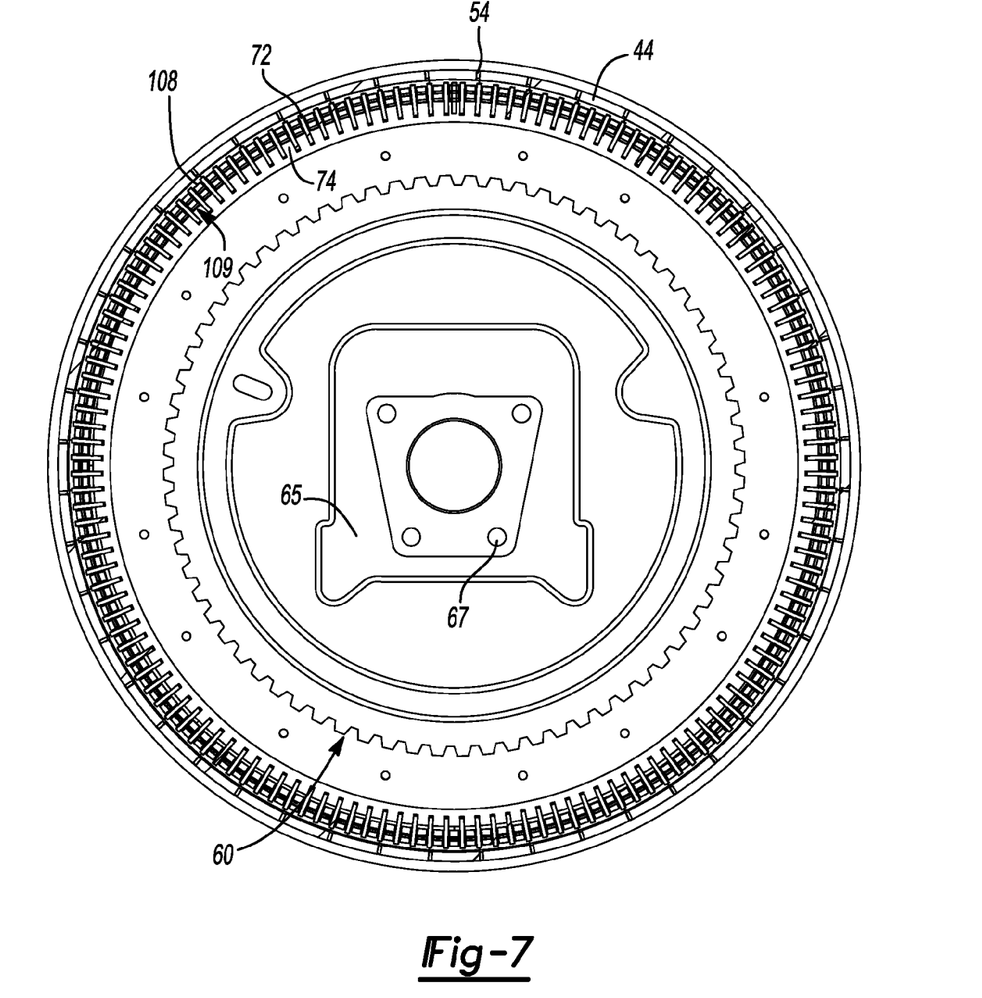
FIG. 7 is a partial sectional view of the wheel motor assembly according to the principles of the present disclosure.

Rotor housing 26 can include a plurality of magnets 38 disposed circumferentially about the inner surfaces of the first, second and third rotor portions 28, 30, 32 so as to form a U-shaped magnet arrangement as shown, for example, in FIG. 2. The plurality of magnets 38 can include a first magnet 40 positioned on an axially inner wall 42 of first portion 28, a second magnet 44 positioned on a radially inner wall 46 of second portion 30, and a third magnet 48 positioned on an axially inner wall 50 of third portion 32. It should be appreciated that the first second and third magnets 40, 44, 48 can alternatively be formed as a one-piece magnet in connection with a one-piece rotor housing. The plurality of magnets 38 in either the three-piece or alternative one-piece configurations are circumferentially spaced apart by a gap 54 as generally shown in FIGS. 3 and 7. The polarity of magnets 40, 44, 48 in the three different positions 42, 46, 50 can be such that the magnets 40, 44, 48 of the same polarity are in alignment from the perspective of moving from the axially inner wall 42 to radially inner wall 46 to axially inner wall 50, or vice-versa.

Figure 5:
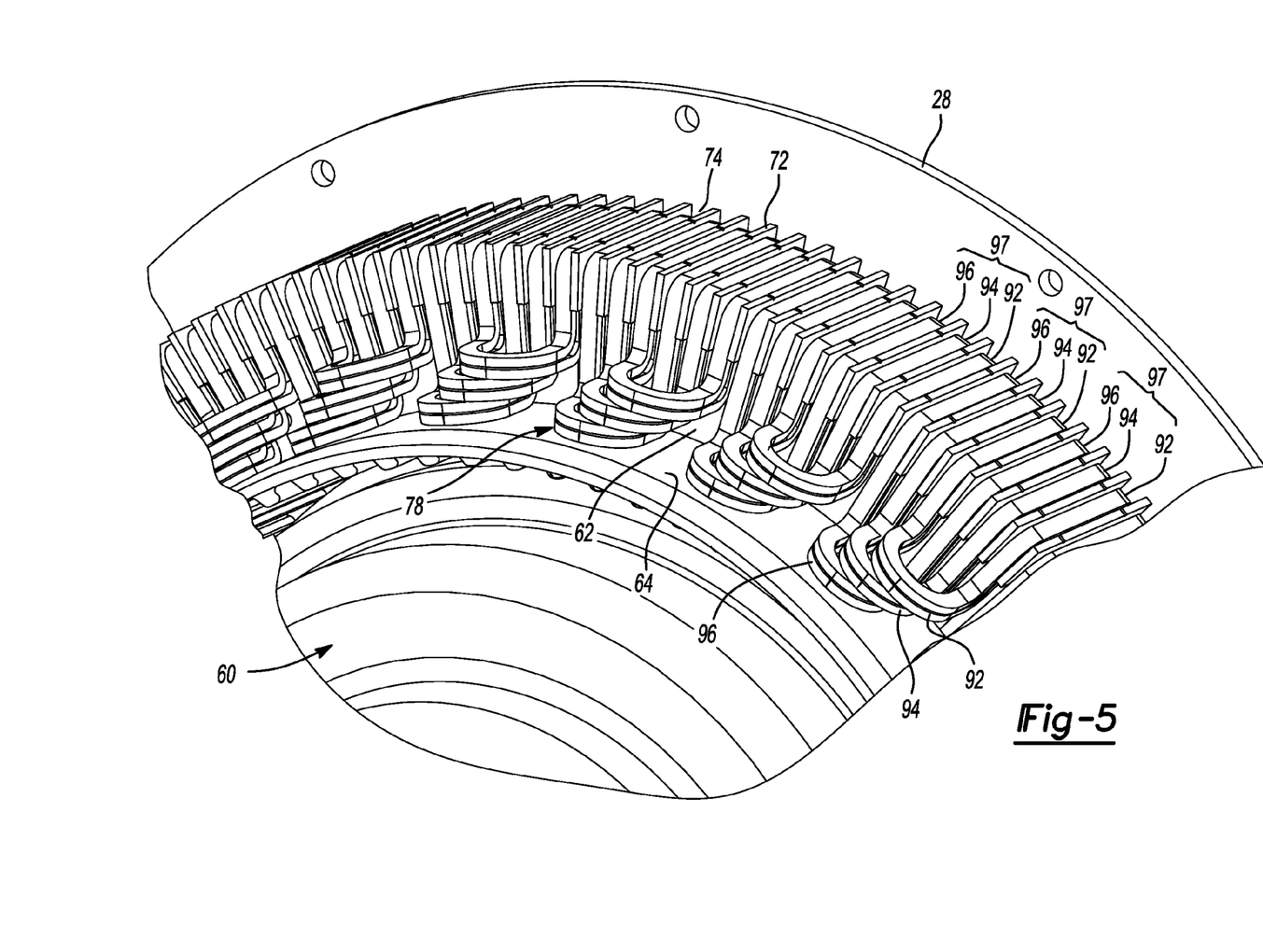
FIG. 5 is a partial perspective view of a winding assembly positioned on a stator according to the principles of the present disclosure.
Figure 6:
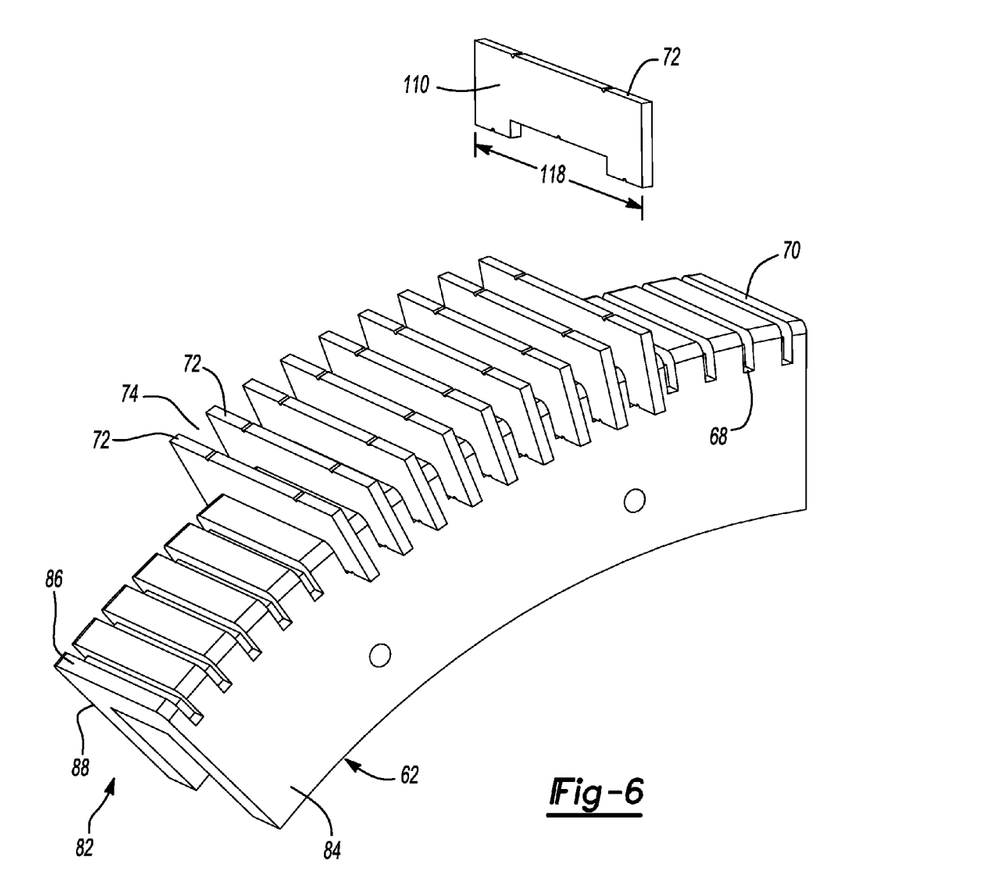
FIG. 6 is a partial perspective view of a stator core according to the principles of the present disclosure.

The stator 22 can include a body portion 60 made of any suitable structural material, such as aluminum, and a core 62 affixed to a radially outboard portion 64 of body portion 60 as shown in FIG. 2. The body portion 60 can include a mounting area 65 having apertures 67 for fixing stator 22 to a mounting plate 69 of wheel hub assembly 24. Stator body portion 60 can further be configured so as to be positioned around a brake drum assembly 81 as generally shown in FIG. 2. Stator core 62 can include a generally u-shaped configuration 82 and can be formed with an insulated powdered metal material. The stator core 62 can also include a plurality of slots 68 formed in a radially outboard axial surface 70 for receiving a corresponding plurality of laminations 72. The plurality of laminations 72 can in turn form another corresponding plurality of slots 74 between a corresponding pair of adjacently positioned laminations 72 as best shown in FIGS. 5 and 6. The plurality of slots 74 can then receive a winding assembly 78, as will be discussed.

The stator core u-shaped configuration 82 can include an inner axial side 84, a radially outboard side 86, and an outer axial side 88. Stator 22 can be fixed to wheel hub assembly 24 and generally nested within rotor 20 such that the sides 84, 86, 88 of u-shaped stator core 62 are positioned parallel to and adjacent walls 42, 46, 50 of housing 26. The solid stator core 62 formed with the insulated powder metal can cooperate with the U-shape configuration 82 to provide a three-dimensional flux carrying capability to match the three-directional locations of magnets 40, 44, 48.

Figure 4:
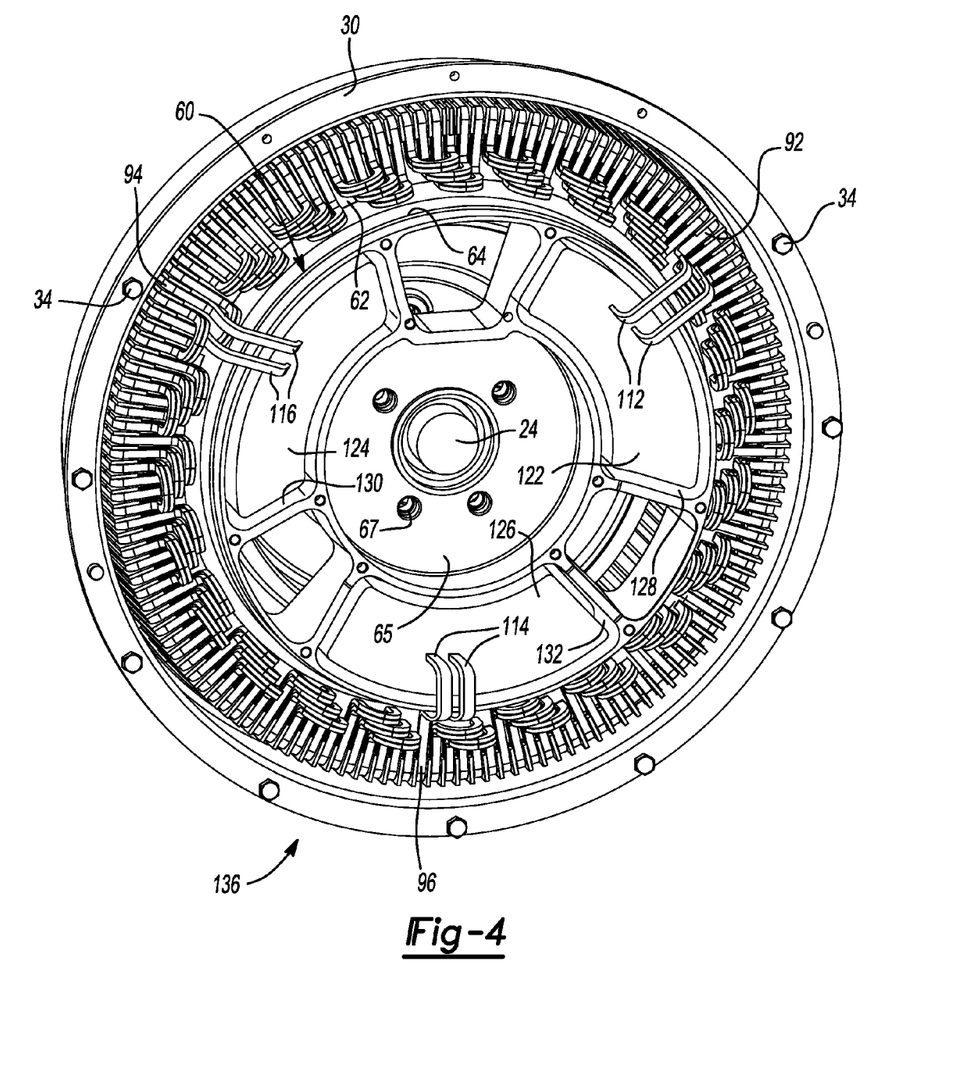
FIG. 4 is a partial side view of the wheel motor assembly according to the principles of the present disclosure.

The winding assembly 78 can include first, second and third pairs of winding elements 92, 94, 96 as generally shown in FIGS. 5 and 7. Each pair of winding elements 92, 94, 96 can include two individual wire windings that are overlaid on top of one another in a double layer configuration and serially wound around the stator core 62. Each pair of windings elements 92, 94, 96 can be positioned in every fourth slot of the plurality of slots 74 as they are serially would around the circumference of the stator core 62 as best shown in FIG. 4. In this manner, there can be a repeating pattern 97 of winding elements 92, 94, 96 positioned adjacent to each other and repeating with every fourth slot 74, as shown in FIG. 7. In addition, each pair of winding elements can conform to the u-shape configuration 82 of stator core 62 as they are positioned in a respective slot of the plurality of slots 74 as generally shown, for example, in FIGS. 2 and 5. With this configuration, winding elements 92, 94, 96 are positioned generally parallel to and spaced apart by air gaps 100, 102, 104 from respective magnets 40, 44, 48 when rotor 20 and stator 22 are assembled in wheel motor 10.

The winding elements 92, 94, 96 can also include a rigid or semi-rigid construction such that they can be pre-formed in a configuration to conform to the u-shaped stator core 62 so as to be readily positioned about stator core 62 in the plurality of slots 74 during an assembly operation. Each pair of winding elements 92, 94, 96 can further include a square or substantially square shape 108 when viewed in cross-section as shown in FIG. 7, and can be encapsulated in a plastic insulating material such that they are insulated from one another and the stator 22. It should also be appreciated that winding elements 92, 94, 96 can also include other shapes, such as a rectangular or substantially rectangular shape when viewed in cross-section. By using the relatively large square cross section 108 in a double layer configuration 109, as well as the rigid construction of winding elements 92, 94, 96, as compared to a winding arrangement utilizing a plurality of flexible strands of wire lying on top of one another with multiple crossovers, both the reliability and assembly effort associated with the winding elements are improved. The winding elements 92, 94, 96 can also each include termination ends 112, 114, 116 for coupling the respective winding elements to a respective controller, as will be discussed.

The plurality of laminations 72 can thus serve to accurately position the respective winding elements 92, 94, 96 about the stator core 62. By using the laminations 72 in place of a slotted or toothed stator core, the stator core 62 manufacturing complexity can be reduced, and the stator core can have a more open geometry with the laminations 72 serving as guides for more easily positioning the winding elements 92, 94, 96 about the stator core in slots 74, as previously discussed. The laminations 72 can include a generally rectangular shape 110 having a width 118 at least as wide as the outer surfaces of the windings elements 92, 94, 96 that are formed about axial sides 84, 88 of stator core 62 as generally shown in FIG. 2.

The wheel motor assembly 10 can further include three controllers 122, 124, 126 arranged to be coupled to the respective terminating ends 112, 114, 116 of each respective pair of winding elements 92, 94, 96. Controllers 122, 124, 126 can be mounted in respective pockets 128, 130, 132 formed in stator body portion 60 as shown in FIG. 4. The pockets 128, 130, 132 can be formed on an axially inner side 136 of body portion 60 and proximate the radially outboard portion 64 so as to position the controllers 122, 124, 126 in close proximity to the winding assembly 78 as also shown in FIG. 4. The pockets can be positioned radially outboard of mounting area 65 and radially inboard of the stator core 62.

With this packaging arrangement, the controllers can advantageously be housed within the wheel assembly and connected directly to the terminating ends 112, 114, 116 of the winding elements 92, 94, 96 thereby improving efficiency of power transmission and reducing the need for additional electrical connections. Further, by packaging the controllers 122, 124, 126 in the stator 22, a need for an externally provided controller and corresponding connection to the wheel motor assembly is eliminated thereby reducing vehicle complexity. Each of the controllers 122, 124, 126 can individually supply electrical power to a respective pair of winding elements 92, 94, 96 via their respective terminating ends 112, 114, 116 such that a three phase power supply configuration can be established that, in cooperation with stator core 62, winding elements 92, 94, 96 and magnets 40, 44, 48, create a three-dimensional electromagnetic flux that generates torque to advance the rotor 20 rotationally about the stator 22 as discussed below.

With reference to FIGS. 3 and 7, the plurality of magnets 38 can be sized and positioned such that one magnet of the plurality of magnets 38 can cover one repeating pattern 97 of winding elements 92, 94, 96 positioned circumferentially around rotor 20 and stator 22. To advance rotor 20 in a forward or reverse direction, controllers 122, 124, 126 can determine a position of the rotor magnets 40, 44, 48 relative to each pair of windings elements in the repeating pattern 97. One of controllers 122, 124, 126 can then provide current to a respective pair of windings 122, 124, 126 that is circumferentially advanced of magnets 40, 44, 48 to create a three-dimensional magnetic flux that draws magnets 40, 44, 48 to the energized set of windings thereby rotating rotor 20 in the desired direction. Controllers 122, 124, 126 can then selectively energize respective winding elements 92, 94, 96 circumferentially around stator 22 to continually advance magnets 40, 44, 48 and thus rotate rotor 20 in the desired direction of rotation. For example, controller 122 can supply electrical current to the pair of winding elements 92 thereby generating electromagnetic flux proximate winding elements 92. Controller 122 can then turn off current supply while controller 124 turns on current supply thereby generating electromagnetic magnetic flux proximate winding elements 94 positioned adjacent to winding elements 92 and thereby advancing rotor 20 in a direction of sequentially energized winding elements 92, 94, and 96 circumferentially around stator 22.

Wheel assembly 10 can also include a sealing element 140 arranged to provide a watertight seal between rotor 20 and stator 22 as shown in FIG. 2. Sealing element 140 can be in the form of a lip seal 142 having a body portion 144 affixed to stator 22 and a lip portion 146 arranged to sealingly engage and ride against rotor 20. It should be appreciated that while a lip seal has been discussed, any appropriate sealing element can be used to seal the rotor to the stator. Further, it should also be appreciated that the seal body portion 144 can alternatively be affixed to rotor 20 and the lip portion can then be arranged to engage and ride against the stator 22.

Rotor 20 can also include a cooling arrangement 150 disposed in third housing portion 32 as generally shown in FIG. 3. The cooling arrangement 150 can include a plurality of apertures 152 positioned in an outer wall 154 of third housing portion 32. The apertures 152 can be separated by a corresponding plurality of radial fins 156 positioned on each side of plurality of apertures 152. A plurality of ramped surfaces 158 can extend axially inboard from outer wall 154 and can be positioned between each fin 156 so as to have a radially outboard edge abut each aperture 152 as shown in FIG. 3. In operation, the plurality of fins 156 and ramped surfaces 158 can cooperate to direct a flow of air through the apertures 152 to cool the components of wheel motor assembly 10.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims.

Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A wheel motor, comprising:
    a stator adapted to be coupled to a vehicle structure, the stator including a body portion and a core, said core extending radially outward from said body portion;
    a rotor disposed about said stator and having a portion positioned radially outboard of and around said stator core, said rotor portion having a plurality of magnets aligned with said stator core, and said rotor adapted to be coupled to a rotatable vehicle component so as to be rotatable relative to the stator;
    at least one winding element disposed circumferentially around said stator core; and
    a controller positioned in a pocket integrally formed in the body portion of said stator; said controller coupled to said at least one winding element and arranged to selectively provide a supply of current to said at least one winding element to generate a magnetic flux to rotate said rotor relative to said stator;
    wherein said stator core comprises a U-shaped stator core, said U-shaped stator core having axially inboard an outboard radial surfaces spaced apart from each other and connected by a radially outermost axial surface, and wherein the rotor portion comprises a corresponding U-shape configured so as to receive the U-shaped stator core substantially within the U-shape of the rotor portion, the rotor U-shape portion having axially inboard and outboard radial surfaces spaced apart from each other and connected by a radially outermost axial surface.

2. The wheel motor of claim 1, further comprising a plurality of U-shaped magnets positioned circumferentially around the rotor U-shaped portion, each of the plurality of magnets being spaced circumferentially spaced apart from each other.

3. The wheel motor of claim 2, wherein the plurality of U-shaped magnets includes three discrete magnets.

4. The wheel motor of claim 2, wherein the stator core includes a plurality of radial slots positioned in the outermost axial surface and spaced apart circumferentially around the stator core, the plurality of slots arranged to receive a corresponding plurality of laminations, the plurality of laminations configured to radially extend from the stator core outermost axial surface so as to form a plurality of lamination slots.

5. The wheel motor of claim 4, wherein the at least one winding element includes three sets of winding elements, each set of winding elements arranged to be positioned around the stator core in every fourth lamination slot of the plurality of lamination slots such that a repeating pattern of the three sets of windings is established around the stator core, and each set of winding elements being configured to substantially conform to the U-shape of the stator core.

6. The wheel motor of claim 5, wherein each set of the three sets of winding elements are stacked in a double layer configuration in a respective lamination slot, and wherein the U-shaped rotor portion is disposed about the stator core having the three sets of winding elements stacked in the double layer configuration in the lamination slots such that there is an air gap between the winding elements and the plurality of rotor magnets.

7. The wheel motor of claim 6, wherein the controller includes three controllers, each of the three controllers positioned in a respective pocket integrally formed in the stator body and coupled to a respective set of the three sets of windings; and
    wherein each of the three controllers is configured to selectively supply current to a respective set of winding elements so as to generate a selectively positioned three-dimensional flux in the air gap to rotate the rotor relative to the stator.

8. The wheel motor assembly of claim 1, further comprising a sealing element, the sealing element having a body portion positioned on the stator and a sealing portion extending from the body portion, the sealing portion arranged to sealingly engage the rotor so as to maintain a watertight connection between the rotor and the stator.

9. The wheel motor assembly of claim 1, wherein the stator is disposed about a brake drum assembly such that the brake drum assembly is positioned radially inboard of the stator core.

10. The wheel motor assembly of claim 1, wherein the pocket is formed in the stator body and positioned radially inboard of the stator core and radially outboard of a mounting portion for mounting the stator to the vehicle structure.

11. The wheel motor assembly of claim 1, wherein the stator core comprises an insulated powdered metal stator core.

12. The wheel motor of claim 1, wherein the winding element includes one of a square and a rectangular shape in cross-section.

13. The wheel motor of claim 1, wherein the rotor includes a three-piece construction having a first portion substantially positioned on an axially inboard side of the wheel motor, a second portion positioned substantially at an axially outboard side of the wheel motor, and a third portion connecting the axially inboard and outboard portions.

14. The wheel motor of claim 13, wherein the axial outboard portion is adapted to be mounted to the wheel hub.

15. The wheel motor of claim 13, wherein the axially outboard portion includes an air circulating arrangement for cooling the wheel motor assembly, the air circulating arrangement comprising an inwardly angled annular recess having a plurality of apertures formed therein, each of the plurality of apertures being separated by a radial fin.

16. A wheel motor, comprising:
    a stator adapted to be fixed to a wheel hub assembly, the stator including a body portion and a core formed from insulated powdered metal, the body portion having a mounting region adapted to engage the wheel hub assembly, the core having a U-shape and positioned radially outboard of the body portion, the U-shape including axially inboard and outboard radial surfaces spaced apart from each other and connected by a radially outermost axial surface, the radially outermost axial surface including a plurality of radial slots spaced apart from each other around a circumference of the stator core;

a rotor disposed about said stator and having a U-shaped portion positioned radially outboard of and around said U-shaped stator core, said rotor having a plurality of magnets positioned in a U-shaped configuration on a radially inner surface of the rotor U-shaped portion, said rotor adapted to be coupled to a rotatable portion of said wheel hub assembly so as to be rotatable relative to said stator;

a plurality of laminations positioned in the plurality of radial slots and arranged to extend radially outboard from the stator core outermost axial surface so as to form a plurality of lamination slots;

at least one winding element disposed circumferentially about the stator core so as to be positioned in each lamination slot, said at least one winding element substantially conforming to the U-shape of the stator core;

a controller positioned in a pocket integrally formed in the stator body portion, the pocket positioned radially inboard of the stator core and radially outboard of the mounting area, said controller coupled to the at least one winding element;

wherein the rotor U-shaped portion is disposed about the stator core U-shaped portion such that the respective axially inboard and outboard surfaces and the radially outboard surfaces of the rotor and stator are opposed from each other and there is an air gap between the plurality of U-shaped rotor magnets and the at least one winding element, and wherein said controller is arranged to selectively provide a supply of current to the at least one winding element to generate a three dimensional magnetic flux to rotate the rotor relative to the stator.

17. The wheel motor of claim 16, wherein the at least one winding element includes three pairs of winding elements, each pair of winding elements arranged be positioned circumferentially around the stator core in every fourth lamination slot of the plurality of lamination slots such that a repeating pattern of the three pairs of winding elements is established around the stator core, each pair of winding elements having a substantially square shape in cross section and positioned in a double layer stacked configuration in a respective lamination slot; and wherein the controller includes three controllers, each of the three controllers positioned in a respective pocket integrally formed in the stator body portion and coupled to a respective pair of the three pairs of winding elements, and each of the three controllers configured to selectively provide a supply of current to a respective pair of winding elements so as to generate a selectively positioned three dimensional flux in the air gap to rotate the rotor relative to the stator.

18. The wheel motor of claim 16, wherein the plurality of magnets includes three discrete magnets positioned in a U-shaped configuration on the inner surface of the rotor U-shaped portion and circumferentially spaced apart from each other.

19. The wheel motor of claim 16, wherein the rotor further comprises an axially outboard portion adapted to be mounted to the wheel hub assembly, said axially outboard portion including an air circulating arrangement for cooling the wheel motor assembly, the air circulating arrangement comprising an inwardly angled annular recess having a plurality of apertures formed therein, each of the plurality of apertures separated by a radial fin.

* * * * *